US009249833B2

(12) United States Patent
Murata et al.

(10) Patent No.: US 9,249,833 B2
(45) Date of Patent: Feb. 2, 2016

(54) TAPERED ROLLER BEARING AND POWER TRANSMISSION DEVICE

(71) Applicant: JTEKT CORPORATION, Osaka-shi, Osaka (JP)

(72) Inventors: Junji Murata, Kashiba (JP); Shigeo Kamamoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/564,519

(22) Filed: Dec. 9, 2014

(65) Prior Publication Data

US 2015/0167742 A1   Jun. 18, 2015

(30) Foreign Application Priority Data

Dec. 16, 2013 (JP) ................. 2013-259183

(51) Int. Cl.
*F16C 33/36* (2006.01)
*F16C 33/58* (2006.01)
*F16C 33/66* (2006.01)
*F16C 19/22* (2006.01)
*F16C 19/36* (2006.01)
*F16C 33/46* (2006.01)

(52) U.S. Cl.
CPC ............. *F16C 33/585* (2013.01); *F16C 19/225* (2013.01); *F16C 19/364* (2013.01); *F16C 33/366* (2013.01); *F16C 33/4605* (2013.01); *F16C 33/6614* (2013.01); *F16C 33/6651* (2013.01); *F16C 33/4623* (2013.01); *F16C 33/4682* (2013.01); *F16C 2019/367* (2013.01); *F16C 2240/70* (2013.01)

(58) Field of Classification Search
CPC ................................ F16C 33/36; F16C 33/366

USPC ................................................... 384/564, 571
See application file for complete search history.

(56) References Cited

U.S. PATENT DOCUMENTS

| 8,899,839 | B2 * | 12/2014 | Liang | ................... F16C 19/225 384/564 |
| 2001/0012420 | A1 * | 8/2001 | Unno | ................... F16C 19/225 384/571 |
| 2007/0041677 | A1 * | 2/2007 | Masuda | ................ F16C 19/225 384/571 |

(Continued)

FOREIGN PATENT DOCUMENTS

| EP | 1 754 898 A2 | 2/2007 |
| JP | S54-89147 A | 7/1979 |

(Continued)

OTHER PUBLICATIONS

Apr. 13, 2015 Extended Search Report issued in European Application No. 14 19 7761.1.

*Primary Examiner* — Phillip A Johnson
(74) *Attorney, Agent, or Firm* — Oliff PLC (57) ABSTRACT

In a tapered roller bearing, each of tapered rollers has a roller large end face, and a large rib end face of an inner ring. The large rib end face is formed at such a position that the large rib end face passes through the reference point, and a curvature radius of the large rib end face is set to a value within a range from 100% to 120% of a distance from a cone center of each of the tapered rollers to a prescribed reference point that is apart from the cone center along an inner ring raceway surface. The roller large end face is formed at such a position that the roller large end face passes through the reference point, and a curvature radius of the roller large end face is set to a value within a range from 80% to 100% of the distance.

16 Claims, 10 Drawing Sheets

(56) References Cited

U.S. PATENT DOCUMENTS

2007/0041678 A1* 2/2007 Matsuyama .......... F16C 19/225
 384/571
2007/0098317 A1* 5/2007 Matsuyama ............ F16C 33/36
 384/571

FOREIGN PATENT DOCUMENTS

| JP | H04-331813 A | 11/1992 |
| JP | U-5-75520 | 10/1993 |
| JP | 2007-100941 A | 4/2007 |

* cited by examiner

FIG.11

TAPERED ROLLER BEARING AND POWER TRANSMISSION DEVICE

INCORPORATION BY REFERENCE

The disclosure of Japanese Patent Application No. 2013-259183 filed on Dec. 16, 2013 including the specification, drawings and abstract is incorporated herein by reference in its entirety.

BACKGROUND OF THE INVENTION

1. Field of the Invention

The invention relates to a tapered roller bearing and a power transmission device.

2. Description of the Related Art

Figure 11:
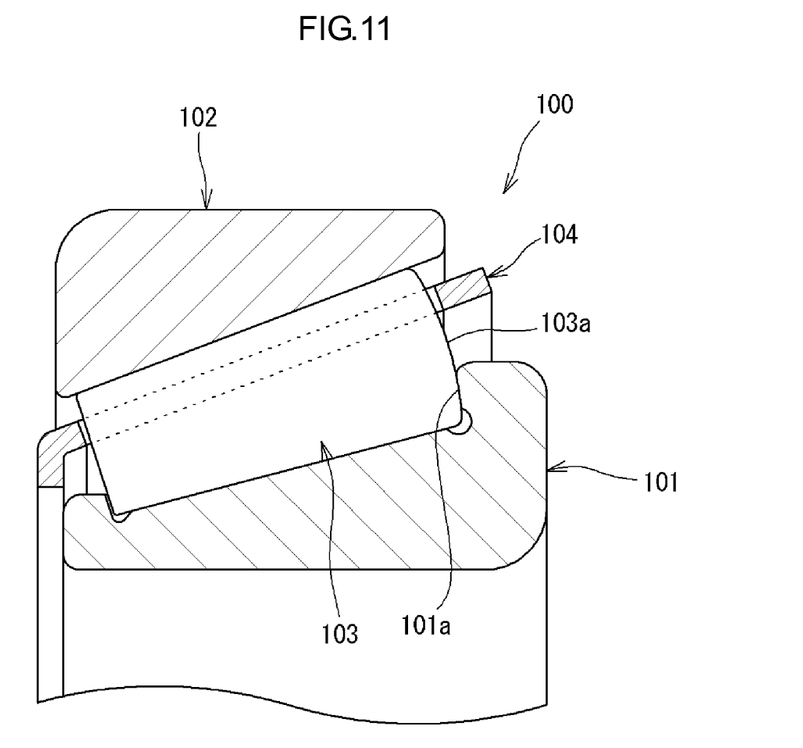
FIG. 11 is a sectional view of a conventional tapered roller bearing, taken along its axial direction.

Tapered roller bearings have a larger load-carrying capacity and a higher stiffness than those of other kinds of equivalent-size rolling bearings. Therefore, tapered roller bearings are adopted in vehicle power transmission devices, such as a differential gear mechanism and a transaxle mechanism, which require bearings having a large load-carrying capacity and a high stiffness. FIG. 11 is a sectional view of a conventional tapered roller bearing, taken along its axial direction. As illustrated in FIG. 11, a tapered roller bearing 100 includes an inner ring 101, an outer ring 102, tapered rollers 103, and an annular cage 104. The tapered rollers 103 are rollably disposed between the inner ring 101 and the outer ring 102. The cage 104 holds the tapered rollers 103 at equal intervals in the circumferential direction. Each tapered roller 103 has a roller large end face 103a formed as a convex face. The inner ring 101 has a large rib end face 101a formed as a concave face. These configurations reduce the sliding friction between the two end faces 103a, 101a (see, for example, Japanese Utility Model Application Publication No. 5-75520).

For the tapered roller bearing 100, the degree of curvature radius of the roller large end face 103a of each tapered roller 103 and that of the large rib end face 101a of the inner ring 101 are not clearly determined. Therefore, if the curvature radius of each of the two end faces 103a, 101a is set to a certain value, it is not possible to reduce the sliding friction between the two end faces 103a, 101a in some cases.

SUMMARY OF THE INVENTION

One object of the invention is to provide a tapered roller bearing and a power transmission device that are configured to effectively reduce the sliding friction between a roller large end face of each tapered roller and a large rib end face of an inner ring.

An aspect of the invention relates to a tapered roller bearing including: an inner ring having an inner ring raceway surface and a cone back face rib (hereinafter, referred to as "large rib") that is adjacent a first axial end of the inner ring raceway surface; an outer ring disposed radially outward of the inner ring so as to be concentric with the inner ring, and having an outer ring raceway surface that faces the inner ring raceway surface; a plurality of tapered rollers rollably disposed between the inner ring raceway surface and the outer ring raceway surface; and a cage that holds the tapered rollers at prescribed intervals in a circumferential direction of the tapered roller bearing. Each of the tapered roller has a roller large end face formed as a convex face, and a large rib end face of the large rib, which is in sliding contact with the roller large end face, is formed as a concave face. When a distance R is defined as a distance from a cone center of each of the tapered rollers to a prescribed reference point that is apart from the cone center along the inner ring raceway surface, the large rib end face is formed at such a position that the large rib end face passes through the reference point, and a curvature radius Ri of the large rib end face is set to a value within a range from 100% to 120% of the distance R, and the roller large end face is formed at such a position that the roller large end face passes through the reference point, and a curvature radius Rr of the roller large end face is set to a value within a range from 80% to 100% of the distance R. In this case, the meaning of "along the inner ring raceway surface" includes not only "along the actual inner ring raceway surface" but also "along an extended line of the inner ring raceway surface".

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
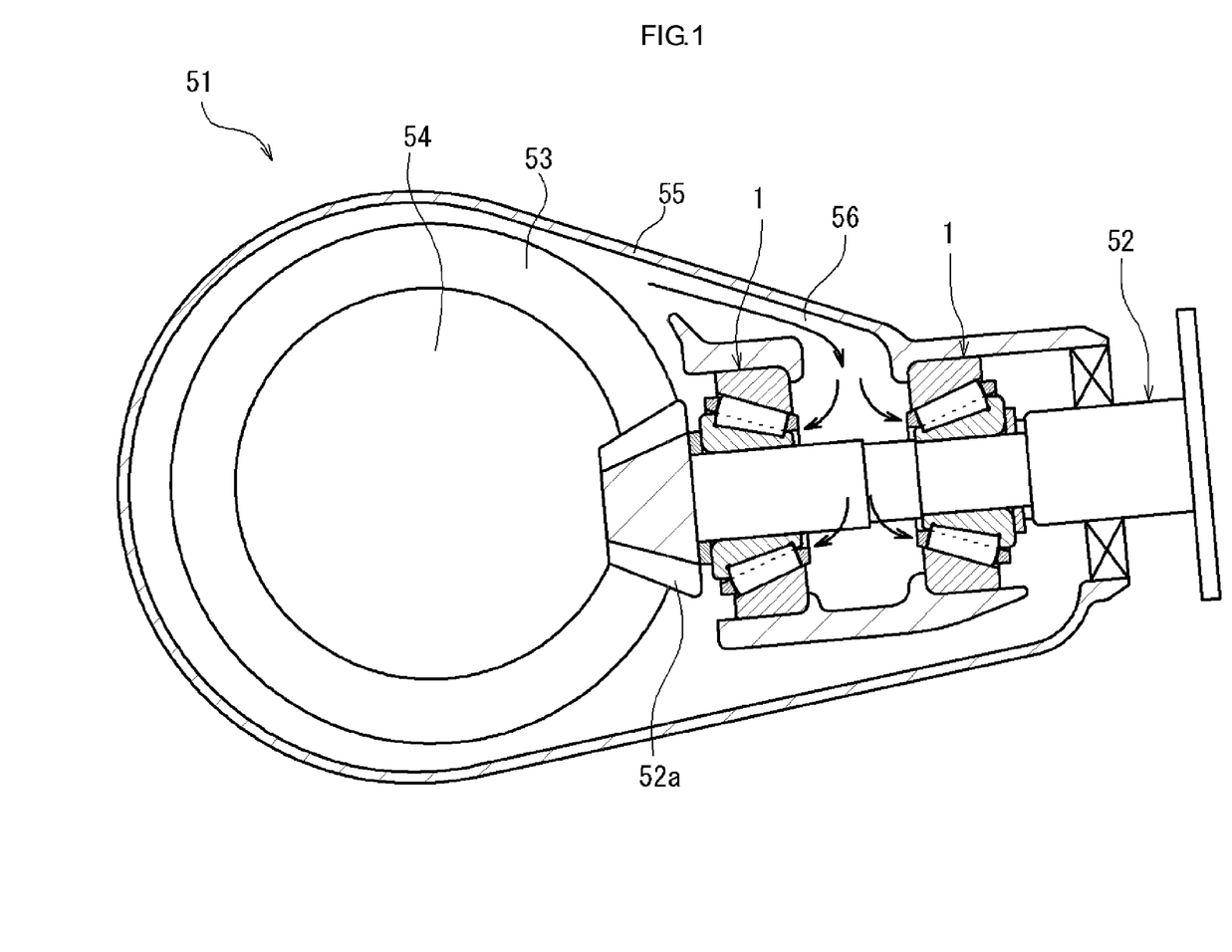
FIG. 1 is a sectional view illustrating a differential device to which a tapered roller bearing according to an embodiment of the invention is applied.

Hereinafter, example embodiments of the invention will be described with reference to the accompanying drawings. FIG. 1 is a sectional view illustrating a differential device 51 that is a power transmission device to which a tapered roller bearing 1 according to an embodiment of the invention is applied. The differential device 51 is disposed on a power transmission path through which the power output from the engine is transmitted. The differential device 51 transmits the power output from the engine to rear wheels that serve as drive wheels and that are respectively disposed on the opposite sides of the differential device 51 in the vehicle lateral direction (i.e., the direction perpendicular to the sheet on which FIG. 1 is drawn).

The differential device 51 includes a pinion shaft (power transmission shaft) 52, a ring gear 53, a differential mechanism 54, and a housing 55 that accommodates these components 52, 53, 54. The pinion shaft 52 is connected to a propeller shaft (not illustrated) that transmits the power output from the engine, so as to be rotatable together with the propeller shaft. The ring gear 53 meshes with a pinion gear 52a disposed at a one axial end portion (distal end portion) of the pinion shaft 52. The differential mechanism 54 is coupled to the ring gear 53 so as to be rotatable together with the ring gear 53, thereby rotating the rear wheels. The pinion shaft 52 is supported by a pair of tapered roller bearings 1 so as to be rotatable relative to the housing 55. In the housing 55, there is formed a lubricant supply path 56 through which lubricant is introduced as indicated by the arrows in FIG. 1 to lubricate raceway surfaces of the tapered roller bearings 1.

Figure 2:
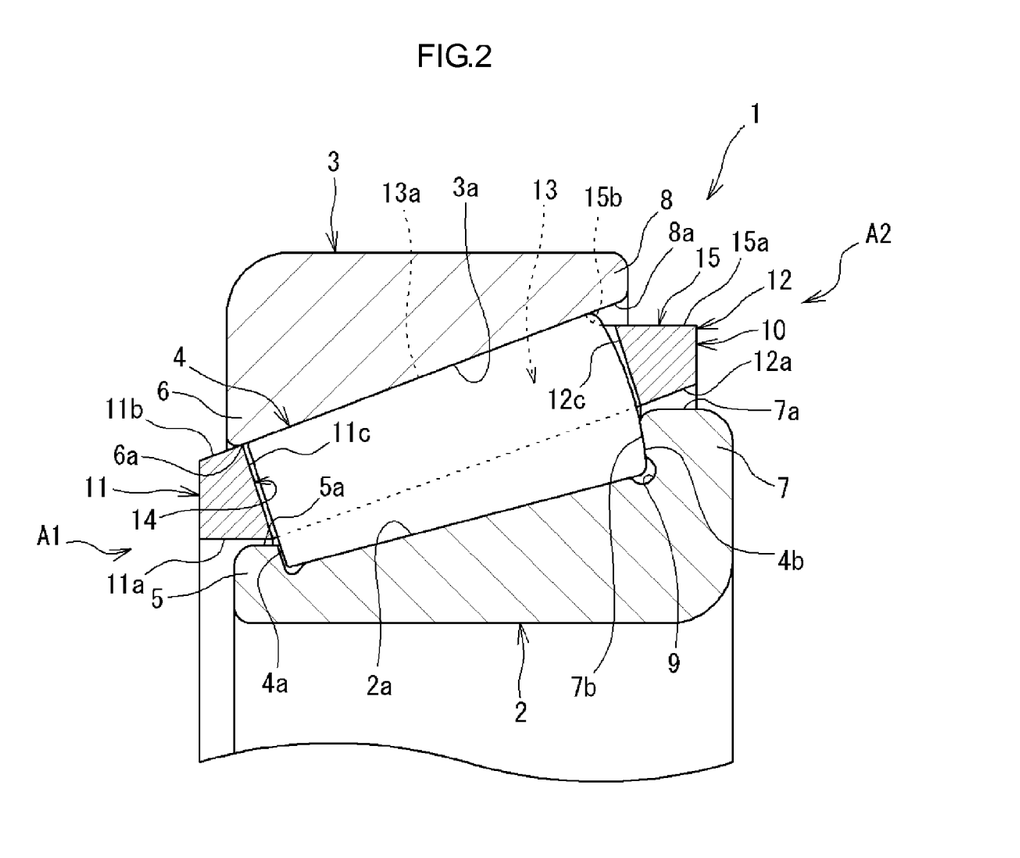
FIG. 2 is a sectional view of the tapered roller bearing taken along its axial direction.

FIG. 2 is a sectional view of the tapered roller bearing 1 taken along its axial direction. The tapered roller bearing 1 includes an inner ring 2, an outer ring 3, a plurality of tapered rollers 4, and a cage 10. The outer ring 3 is disposed radially outward of the inner ring 2 so as to be concentric with the inner ring 2. The tapered rollers 4 are disposed between the inner ring 2 and the outer ring 3. The cage 10 holds the tapered rollers 4 at prescribed intervals along the circumferential direction. The inner ring 2 is an annular member made of bearing steel, steel for machine structural use, or the like. The outer peripheral face of the inner ring 2 has an inner ring raceway surface 2a formed of a tapered face, so that the tapered rollers 4 roll on the inner ring raceway surface 2a. Like the inner ring 2, the outer ring 3 is an annular member made of bearing steel, steel for machine structural use, or the like. The inner peripheral face of the outer ring 3 has an outer ring raceway surface 3a formed of a tapered face. The outer ring raceway surface 3a faces the inner ring raceway surface 2a, and the tapered rollers 4 roll on the outer ring raceway surface 3a. The tapered rollers 4 are members made of bearing steel or the like, and are rollably disposed between the inner ring raceway surface 2a and the outer ring raceway surface 3a.

A cone front face rib (hereinafter, referred to as "small rib") 5 is formed on the outer peripheral face of the inner ring 2 so as to project radially outward, at a position next to a first axial end of the inner ring raceway surface 2a. A large rib 7 is formed on the outer peripheral face of the inner ring 2 so as to project radially outward, at a position next to a second axial end of the inner ring raceway surface 2a. An end face 7b of the large rib 7, the end face 7b being located on the inner ring raceway surface 2a side, is formed as a concave face (the end face 7b will be referred to as "large rib end face 7b"). In a corner portion formed between the inner ring raceway surface 2a and the large rib end face 7b, a grinding undercut portion 9 having a concave section is formed over the entire circumference of the inner ring 2. Each tapered roller 4 has a roller large end face 4b formed as a convex face, and the roller large end face 4b is in sliding contact with the large rib end face 7b.

Figure 3:
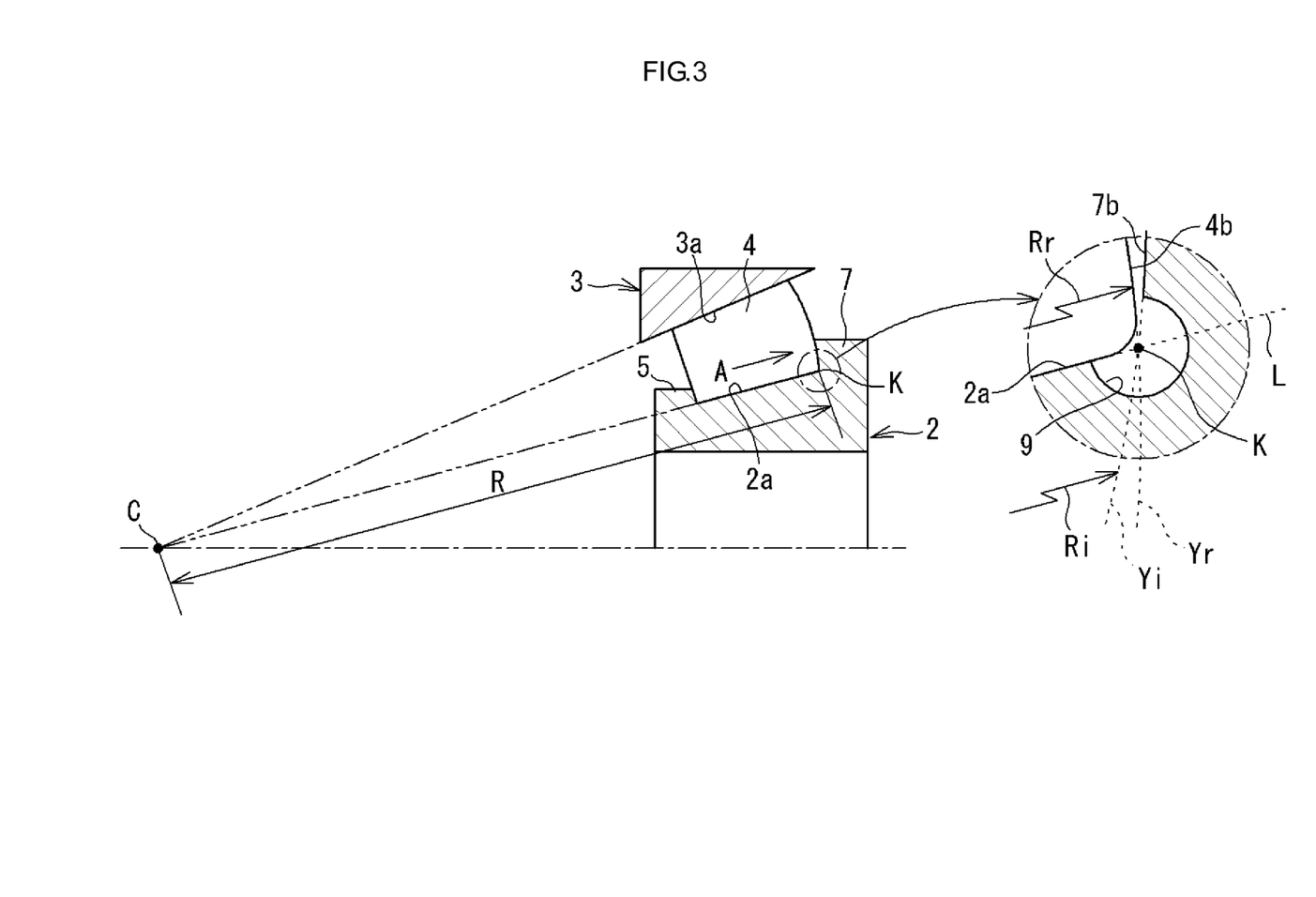
FIG. 3 illustrates the shape of a large rib end face of an inner ring and that of a roller large end face of each tapered roller in the tapered roller bearing.

FIG. 3 illustrates the shape of the large rib end face 7b of the inner ring 2 and that of the roller large end face 4b of each tapered roller 4. As illustrated in FIG. 3, when the distance from a cone center C of each tapered roller 4 to a prescribed reference point K, which is apart from the cone center C along the inner ring raceway surface 2a, is denoted by R, the shape of the large rib end face 7b of the inner ring 2 and the shape of the roller large end face 4b of each tapered roller 4 are set on the basis of the reference point K and the distance R. It should be noted that the "cone center" of each tapered roller 4 means the apex of the conical shape of each tapered roller 4. In addition, the phrase "along the inner ring raceway surface 2a" includes not only a case where the reference point K is actually on the inner ring raceway surface 2a but also a case where the reference point K is on an extension L of the inner ring raceway surface 2a. In the present embodiment, the reference point K is on the extension L of the inner ring raceway surface 2a. The "distance R" is the distance (point-to-point distance) between the cone center C and the reference point K. For example, when the coordinates of the cone center C are (0, 0) and the coordinates of the reference point K are (x, y) in the xy coordinate system, the distance R is a distance that satisfies the relational expression $R^2 = x^2 + y^2$.

The large rib end face 7b of the inner ring 2 is formed at such a position that the large rib end face 7b passes through the reference point K. A curvature radius Ri of the large rib end face 7b is a value within a range from 100% to 120% of the distance R. The above expression "the large rib end face 7b passes through the reference point K" means not only a case where the large rib end face 7b actually passes through the reference point K but also a case where an extension Yi of the large rib end face 7b passes through the reference point K. Therefore, the "reference point K" is a point at which the inner ring raceway surface 2a or the extension L of the inner ring raceway surface 2a intersects with the large rib end face 7b or the extension Yi of the large rib end face 7b. In the present embodiment, the extension Yi of the large rib end face 7b passes through the reference point K.

The roller large end face 4b of each tapered roller 4 is formed at such a position that the roller large end face 4b passes through the reference point K. A curvature radius Rr of the roller large end face 4b is a value within a range from 80% to 100% of the distance R. The above expression "the roller large end face 4b passes through the reference point K" means not only a case where the roller large end face 4b actually passes through the reference point K but also a case where an extension Yr of the roller large end face 4b passes through the reference point K. In the present embodiment, the extension Yr of the roller large end face 4b passes through the reference point K. In addition, in the present embodiment, the curvature radius Ri of the large rib end face 7b and the curvature radius Rr of the roller large end face 4b satisfy the relational expression $R = (Ri + Rr)/2$.

Figure 4:
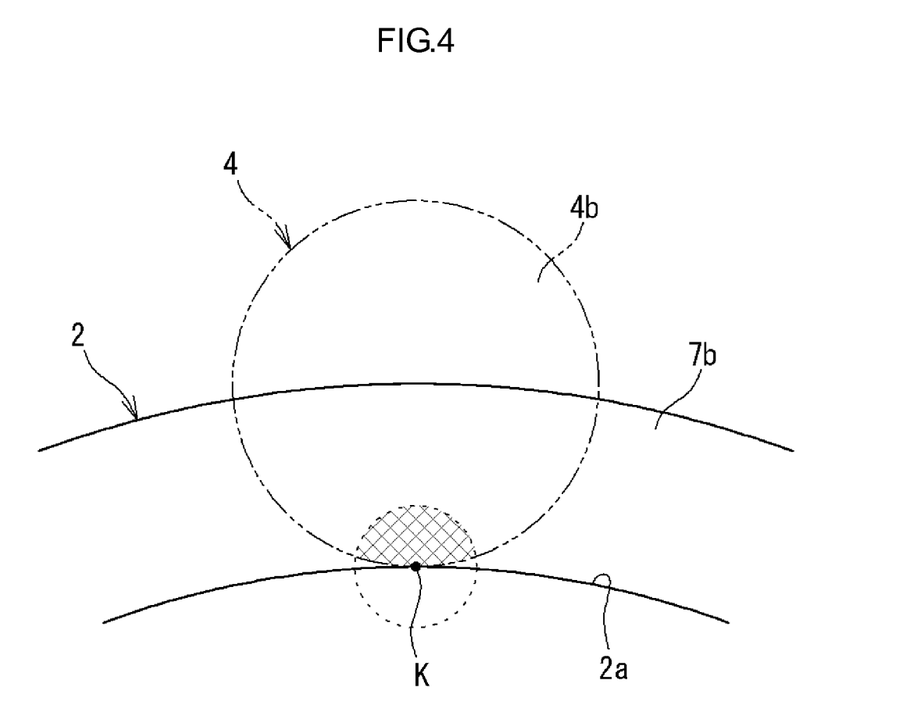
FIG. 4 is a view of the large rib end face of the inner ring as viewed from a direction A.

With the configuration described above, the roller large end face 4b of each tapered roller 4 is in sliding contact with a radially inner end portion of the large rib end face 7b of the inner ring 2 as illustrated in FIG. 4. The radially inner end portion is a portion (cross-hatched portion in FIG. 4) located within a virtual circle around the reference point K. Thus, the area in which the roller large end face 4b and the large rib end face 7b are in sliding contact with each other is made smaller than that in a case where the roller large end face 4b is in sliding contact with a radially outer side portion of the large rib end face 7b. Hence, the sliding friction between the roller large end face 4b of each tapered roller 4 and the large rib end face 7b of the inner ring 2 is reduced effectively. Further, in the present embodiment, the curvature radius Ri of the large rib end face 7b and the curvature radius Rr of the roller large end face 4b satisfy the relational expression $R = (Ri + Rr)/2$, and thus the area in which the roller large end face 4b and the large rib end face 7b are in sliding contact with each other is made further smaller. Hence, the sliding friction between the roller large end face 4b of each tapered roller 4 and the large rib end face 7b of the inner ring 2 is reduced further effectively.

Figure 5:
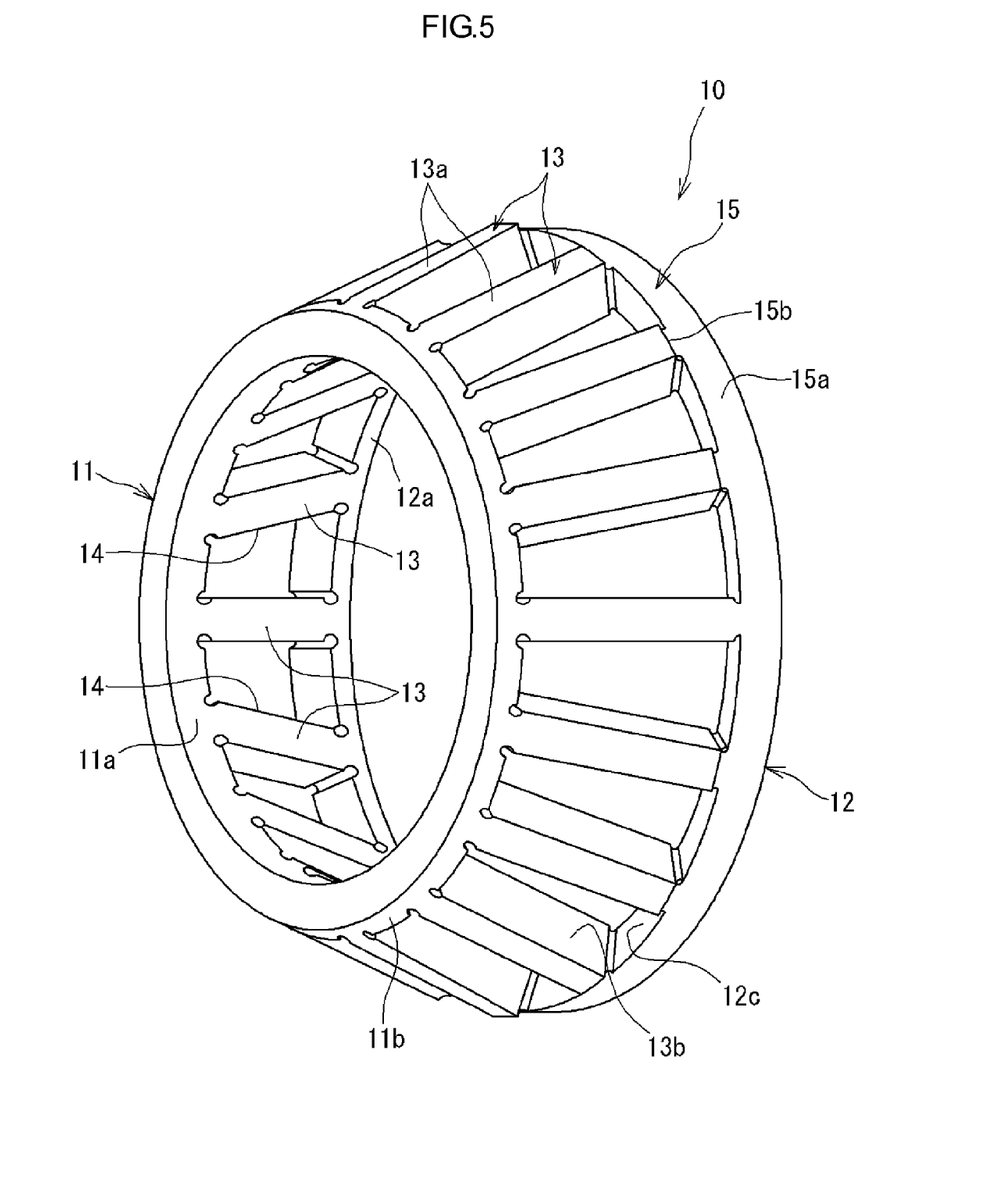
FIG. 5 is a perspective view of a cage of the tapered roller bearing.

FIG. 5 is a perspective view of the cage 10. As illustrated in FIG. 5 and FIG. 2, the cage 10 is a member made of synthetic resin and formed by, for example, injection molding. The cage 10 includes a pair of annular portions 11, 12 (a smaller-diameter annular portion 11 and a larger-diameter annular portion 12), and a plurality of cage bars 13. The annular portions 11, 12 face each other at a prescribed distance. The cage bars 13 are arranged at prescribed intervals in the circumferential direction, and are extended between the annular portions 11, 12 to connect the annular portions 11, 12 to each other. The annular portions 11, 12 and any two adjacent cage bars 13 define a cage pocket 14 in which the tapered roller 4 is held and accommodated.

The cage 10 is disposed in an annular space between the inner ring 2 and the outer ring 3, and the tapered rollers 4 are accommodated in the cage pockets 14 of the cage 10. The cage 10 holds the tapered rollers 4 so that the tapered rollers 4 are arranged at substantially equal intervals in the circumferential direction.

The annular portions 11, 12 of the cage 10 respectively have annular-portion side faces 11*c*, 12*c* that face toward the cage pockets 14. The annular-portion side faces 11*c*, 12*c* are brought in sliding contact with end faces 4*a*, 4*b* of the tapered rollers 4, respectively, so that displacement of the cage 10 in the axial direction is restricted. That is, the cage 10 is positioned in the axial direction by the sliding contact of the two annular portions 11, 12 with the end faces 4*a*, 4*b* of the tapered rollers 4. In this way, the annular-portion side faces 11*c*, 12*c* of the annular portions 11, 12 are brought into sliding contact with the end faces 4*a*, 4*b* of the tapered rollers 4, thereby constituting first sliding-contact faces that position the cage 10 in the axial direction using the end faces 4*a*, 4*b* of the tapered rollers 4.

As illustrated in FIG. 5, radially outer faces 13*a* of the cage bars 13 of the cage 10 constitute a generally tapered face shape extending along the outer ring raceway surface 3*a*. Relative rotation between the inner ring 2 and the outer ring 3 causes the cage 10 to rotate in the circumferential direction with the outer-side faces 13*a* of the cage bars 13 kept in sliding contact with the outer ring raceway surface 3*a*. That is, the cage 10 in the present embodiment is positioned in the radial direction by the outer ring raceway surface 3*a* as the cage 10 is in sliding contact with the outer ring raceway surface 3*a*. In this way, the outer-side faces 13*a* of the cage bars 13 in the present embodiment are brought into sliding contact with the outer ring raceway surface 3*a*, thereby constituting second sliding-contact faces that position the cage 10 in the radial direction using the outer ring raceway surface 3*a*.

The smaller-diameter annular portion 11 is a ring-shaped portion having a relatively large thickness, and is disposed between the small rib 5 of the inner ring 2 and a first axial end portion 6 of the outer ring 3. The smaller-diameter annular portion 11 closes a first-end-side annular opening A1 that is defined by the small rib 5 and the first axial end portion 6 of the outer ring 3.

The smaller-diameter annular portion 11 has a generally cylindrical inner peripheral face 11*a*. A small clearance is formed between the inner peripheral face 11*a* and an outer peripheral face 5*a* of the small rib 5. The smaller-diameter annular portion 11 has a tapered outer peripheral face 11*b* that extends along the outer-side faces 13*a* of the cage bars 13. A small clearance is formed between the outer peripheral face 11*b* and the inner peripheral face 6*a* of the first axial end portion 6. In this way, the smaller-diameter annular portion 11 closes the first-end-side annular opening A1 with a small clearance formed between the small-diameter annular portion 11 and the small rib 5 and another small clearance formed between the small-diameter annular portion 11 and first axial end portion 6 of the outer ring 3.

The small clearances located on the first axial end side and formed by closing first-end-side annular opening A1 serve as inlets through which the lubricant that lubricates the tapered roller bearing 1 flows into the tapered roller bearing 1. That is, in the tapered roller bearing 1, as the inner ring 2 and the outer ring 3 rotate relative to each other, a centrifugal force generated by the relative rotation produces pumping action under which the lubricant in the tapered roller bearing 1 flows along the raceway surfaces 2*a*, 3*a* from the small-diameter side toward the large-diameter side.

Under the pumping action, the lubricant flows into the tapered roller bearing 1 through the first-end-side annular opening A1. In this way, the above-described small clearances located on the first axial end side serve as the inlets through which the lubricant that lubricates the tapered roller bearing 1 flows into the tapered roller bearing 1.

If the amount of lubricant that flows into the tapered roller bearing 1 becomes unnecessarily large, the rotary torque of the tapered roller bearing 1 may be increased due to an increase in the agitating resistance or the viscous resistance of the lubricant. In this respect, in the present embodiment, the smaller-diameter annular portion 11 closes the first-end-side annular opening A1 with a small clearance formed between the small-diameter annular portion 11 and the small rib 5 and another small clearance formed between the small-diameter annular portion 11 and first axial end portion 6 of the outer ring 3. Thus, it is possible to prevent an unnecessarily large amount of lubricant from flowing into the tapered roller bearing 1 through the first-end-side annular opening A1, thereby suppressing an increase in, for example, the agitating resistance due to excessive lubricant. As a result, the rotary torque of the tapered roller bearing 1 is reduced.

Like the smaller-diameter annular portion 11, the large-diameter annular portion 12 is a ring-shaped portion having a relatively large thickness, and is disposed between the large rib 7 of the inner ring 2 and a second axial end portion 8 of the outer ring 3. The large-diameter annular portion 12 closes a second-end-side annular opening A2 that is defined by the large rib 7 and the second axial end portion 8 of the outer ring 3.

Figure 6:
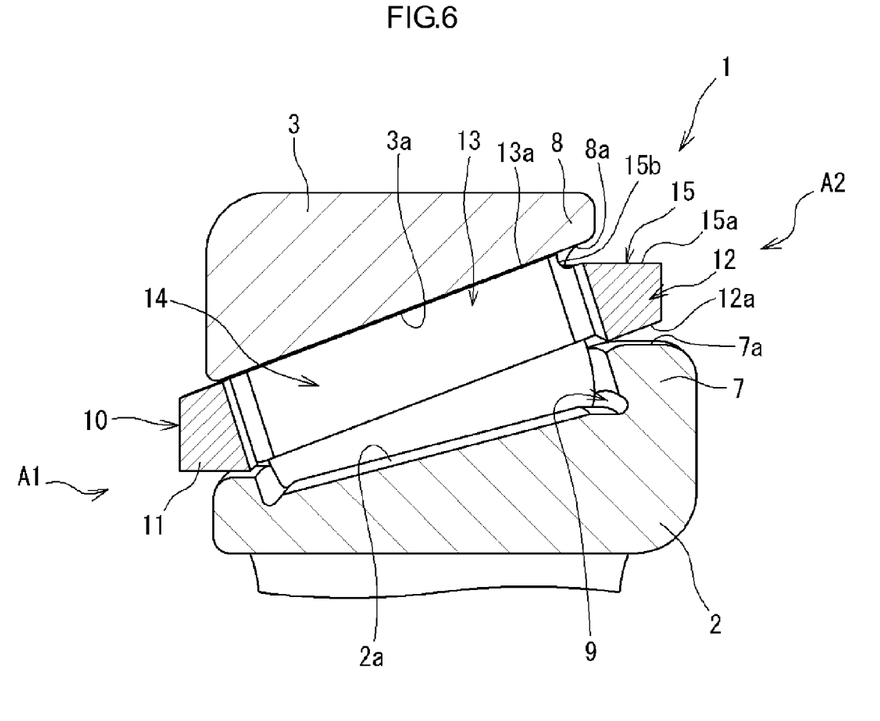
FIG. 6 is a sectional view of the tapered roller bearing from which the tapered rollers are omitted for the purpose of describing the configuration of a cut-away portion.

The larger-diameter annular portion 12 has a cut-away portion 15 on its outer peripheral side. The cut-away portion 15 is formed by cutting away an outer peripheral end portion along the entire circumference. FIG. 6 is a sectional view of the tapered roller bearing 1 from which the tapered rollers 4 are omitted for the purpose of describing the configuration of the cut-away portion 15. As illustrated in FIG. 6 and FIG. 5, the cut-away portion 15 is formed by cutting away a part of the cage 10 radially inward such that the cut-away portion 15 extends from the axial outer edge of the larger-diameter annular portion 12, extends beyond the outer peripheral edges of the cage pockets 14 and reaches the outer peripheral end portions of the cage bars 13. The cut-away portion 15 is defined by a cylindrical face 15*a* and step faces 15*b*. The cylindrical face 15*a* has a generally cylindrical shape. The step faces 15*b* extend from the cylindrical face 15*a* to the outer-side faces 13*a* of the cage bars 13.

As illustrated in FIG. 6, due to formation of the cut-away portion 15, the outer peripheral edges of the cage pockets 14, which are located on a second axial end side of the cage pockets 14, are cut away inward in the radial direction. If the cut-away portion 15 is not formed, the outer peripheral edges of the cage pockets 14, which are located on the second axial end side of the cage pockets 14, are closed off to the outside of the tapered roller bearing 1 by the larger-diameter annular portion 12 and the outer ring raceway surface 3*a*. In the present embodiment, however, the cut-away portion 15 is formed and thus the outer peripheral edges of the cage pockets 14, which are located on a second axial end side of the cage pockets 14, are cut away inward in the radial direction. With this configuration, the outer peripheral edges of the cage pockets 14, which are located on the second axial end side of the cage pockets 14, are open toward the outside of the tapered roller bearing 1. Thus, the lubricant flowing along the outer ring raceway surface 3*a* into the cage pockets 14 is smoothly discharged from the tapered roller bearing 1 through the cut-away portion 15.

A clearance is formed between the cylindrical face 15*a* of the cut-away portion 15 and the inner peripheral face 8*a* of the second axial end portion 8 of the outer ring 3. The larger-diameter annular portion 12 has an inner peripheral face 12*a*, which is a tapered face that extends along the inner peripheral faces of the cage bars 13. A small clearance is formed between the inner peripheral face 12*a* and the outer peripheral face 7*a* of the large rib 7. In this way, the larger-diameter annular portion 12 closes the second-end-side annular opening A2 with a small clearance formed between the large-diameter annular portion 12 and the large rib 7.

These small clearances located on the second axial end side and formed by closing second-end-side annular opening A2 serve as outlets for the lubricant introduced into the tapered roller bearing 1 under the pumping action. That is, the lubricant introduced into the tapered roller bearing 1 under the pumping action is used to lubricate the inside of the tapered roller bearing 1 and is then discharged through the second-end-side annular opening A2. Therefore, the small clearances located on the second axial end side serve as the outlets through which the lubricant is discharged from the tapered roller bearing 1 under the pumping action.

In the present embodiment, the larger-diameter annular portion 12 closes the second-end-side annular opening A2 with a small clearance formed between the large-diameter annular portion 12 and the large rib 7. Thus, it is possible to prevent the lubricant introduced into the tapered roller bearing 1 from being discharged more than necessary to the outside of the tapered roller bearing 1 through the second-end-side annular opening A2.

In particular, the large rib 7 restricts discharge of the lubricant, so that the lubricant is held in the vicinity of the grinding undercut portion 9 (see FIG. 6) located on the inner ring 2 side. The grinding undercut portion 9 is located in the vicinity of a position at which the large rib end face 7*b* and the roller large end face 4*b* of each tapered roller 4 are brought into sliding contact with each other. As a result, the sliding friction between the large rib 7 and the tapered rollers 4 is reduced and the occurrence of, for example, seizure is inhibited.

It is necessary to hold the lubricant at a position near the inner ring 2 having the large rib 7. At the same time, it is necessary, on the outer ring 3 side, to suppress an increase in, for example, the agitating resistance or the viscous resistance of the lubricant. In this respect, in the present embodiment, the cut-away portion 15, through which the lubricant is discharged from the tapered roller bearing 1, is formed on the outer peripheral side of the larger-diameter annular portion 12, so that the outer peripheral edges of the cage pockets 14 are cut away inward in the radial direction. With this configuration, it is possible to smoothly discharge, from the tapered roller bearing 1, the lubricant that is flowing along the outer ring raceway surface 3*a* toward the outside of the tapered roller bearing 1.

In this way, it is possible to appropriately hold the lubricant in the tapered roller bearing 1 at a position near the inner ring 2. Further, on the outer ring 3 side, it is possible to suppress an increase in, for example, the agitating resistance due to excessive lubricant. As a result, it is possible to further reduce the rotary torque of the tapered roller bearing 1, while inhibiting occurrence of, for example, seizure between the large rib 7 and the tapered rollers 4.

Figure 7:
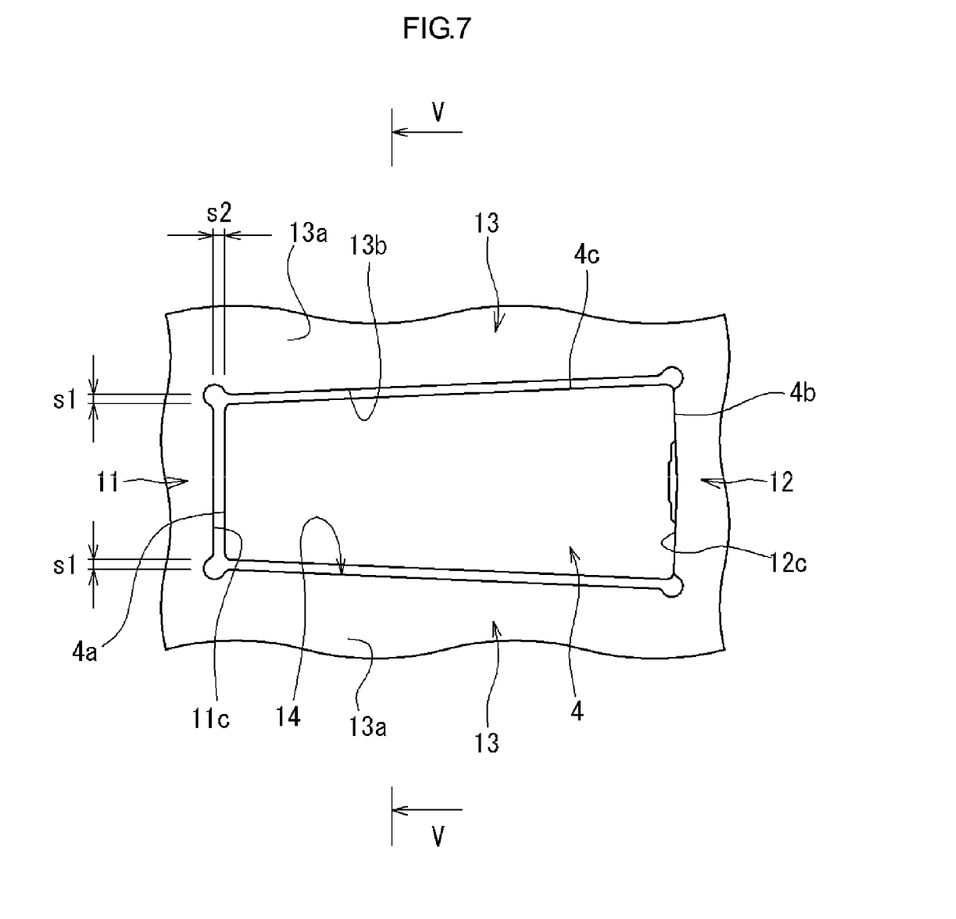
FIG. 7 is a view illustrating each cage pocket of the cage as viewed from the radially outer side.

FIG. 7 is a view illustrating each cage pocket 14 of the cage 10 as viewed from the radially outer side. As illustrated in FIG. 7, a prescribed clearance s1 is formed, in the circumferential direction of the cage 10, between each of the axially-extending wall faces of each cage pocket 14 and a rolling contact surface 4*c* of the tapered roller 4 accommodated in the cage pocket 14. In addition, a prescribed clearance s2 is formed, in the axial direction of the cage 10, between each of the outer peripheral edges of each cage pocket 14 and a corresponding one of the end faces 4*a*, 4*b* of the tapered roller 4 accommodated in the cage pocket 14.

In the tapered roller bearing 1 according to the present embodiment, the cage 10 is positioned in the axial direction by the annular-portion side faces 11*c*, 12*c* (first sliding-contact faces) of the two annular portions 11, 12. In addition, the cage bars 13 have the outer-side faces 13*a* (second sliding-contact faces) that are brought in sliding contact with the outer ring raceway surface 3*a*, thereby positioning the cage 10 in the radial direction using the outer ring raceway surface 3*a*. Hence, the cage 10 is stably positioned in the radial direction by the outer ring raceway surface 3*a*. Thus, it is not necessary to position the cage 10 using the tapered rollers 4, so that appropriate clearances s1, s2 are formed between the wall faces of each cage pocket 14 and the tapered roller 4 as illustrated in FIG. 7. The clearances s1, s2 prevent the cage bars 13 from being constantly in sliding contact with the tapered rollers 4, thereby reducing the sliding friction between each cage bar 13 and the tapered roller 4. In addition, it is possible to inhibit the cage bars 13 from being caught in the tapered rollers 4, and to reduce the rotary torque of the tapered roller bearing 1. As described above, the cage bars 13 are inhibited from being caught in the tapered rollers 4. Therefore, even when the tapered roller bearing 1 rotates at a high speed, it is possible to inhibit the cage bars 13 from being caught in the tapered rollers 4. As a result it is possible to rotate the tapered roller bearing 1 at a higher speed.

With the tapered roller bearing 1 according to the present embodiment, the rotary torque is reduced and the rotational speed is increased. It should be noted that the clearances s1, s2 are set so that it is possible to inhibit the cage bars 13 from being caught in the tapered rollers 4 in the cage pockets 14 and to inhibit the cage bars 13 from being caught in the tapered rollers 4. For example, each of the clearances s1, s2 is set to a clearance of some tenths of one millimeter.

Figure 8:
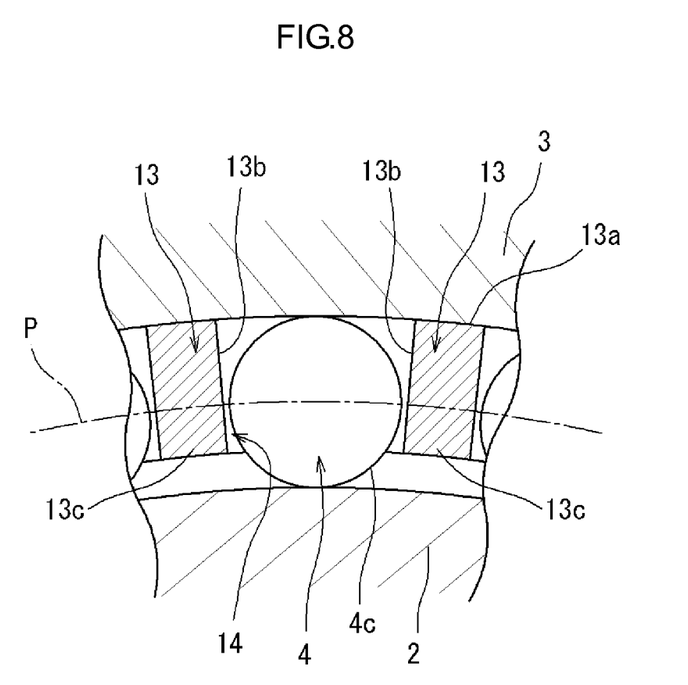
FIG. 8 is a sectional view taken along the line V-V in FIG. 7.

FIG. 8 is a sectional view taken along the line V-V in FIG. 7, and illustrating a section of main portions of the cage 10. Each of the cage bars 13 that define the cage pockets 14 has a cage-bar side face 13*b* that faces toward the inside of the cage pocket 14. The cage-bar side face 13*b* is substantially linear along the radial direction as illustrated in FIG. 8. As described above, the clearances s1, s2 are formed between the wall faces of each cage pocket 14 and the tapered roller 4 accommodated in the cage pocket 14, and the cage-bar side faces 13*b* are substantially linear along the radial direction. Thus, while the tapered rollers 4 arranged adjacent to each other are separated from each other by the cage bars 13, the area of contact between the cage-bar side faces 13*b* of the cage bars 13 and the rolling contact surfaces 4*c* of the tapered rollers 4 is minimized. As a result, it is possible to further reduce the frictional resistance between the cage-bar side faces 13*b* of the cage bars 13 and the rolling contact surfaces 4*c* of the tapered rollers 4.

Each cage bar 13 has a radially inner distal end 13*c* that is located radially inward of a pitch circle P that passes through the axis of each of the tapered rollers 4 as illustrated in FIG. 8. In this case, it is possible hold the tapered rollers 4 such that the tapered rollers 4 adjacent to each other are separated from each other more reliably than in the case were each cage bar 13 has a radially inner distal end 13c that is located radially outward of the pitch circle P.

Figure 9:
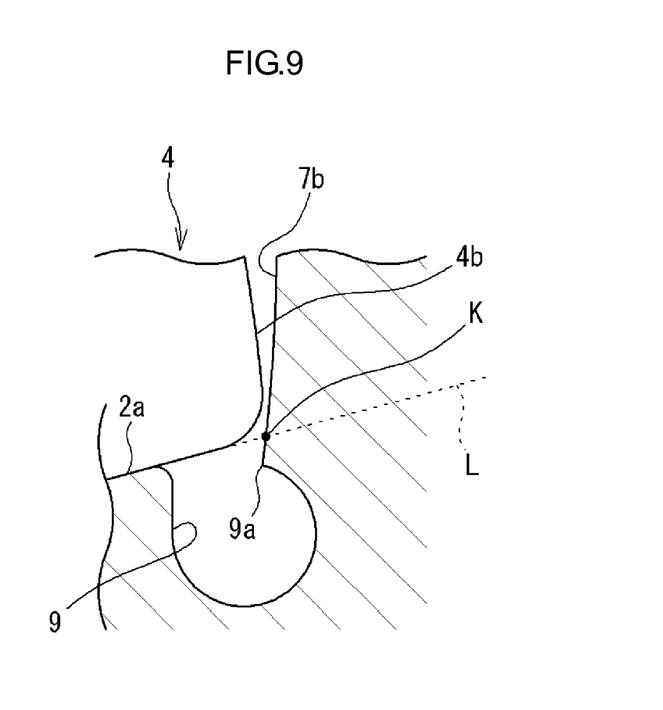
FIG. 9 is a main portion sectional view illustrating a modified example of a grinding undercut portion of the inner ring.

It should be noted that the invention is not limited to the above-described embodiment. For example, in the above-described embodiment, the tapered roller bearing is applied to a differential device. However, the tapered roller bearing may be applied to other power transmission devices such as a transaxle mechanism. In the above-described embodiment, the grinding undercut portion 9 formed in the corner portion formed between the inner ring raceway surface 2a and the large rib end face 7b has a part that is located radially outward of the inner ring raceway surface 2a. However, as illustrated in FIG. 9, the grinding undercut portion 9 may be formed so as to be entirely located radially inward of the inner ring raceway surface 2a. In this case, the reference point K positioned on the extension L of the inner ring raceway surface 2a is located radially outward of the grinding undercut portion 9. Hence, the roller large end face 4b of each tapered roller 4 is brought into sliding contact with the large rib end face 7b of the inner ring 2 so as to be across the grinding undercut portion 9. Thus, it is possible to prevent any damage caused by the contact of the roller large end faces 4b of the tapered rollers 4 with a corner portion (edge portion) 9a of the grinding undercut portion 9.

In the above-described embodiment, the inner peripheral face 12a of the larger-diameter annular portion 12 of the cage 10 is formed as a tapered face that extends along the inner peripheral faces of the cage bars 13. However, as illustrated in, for example, FIG. 10, the inner peripheral face 12a may be formed as a cylindrical face that is brought into sliding contact with the outer peripheral face 7a of the large rib 7. In this case, the inner peripheral face 12a that constitutes a third sliding-contact face is brought into sliding contact with the outer peripheral face 7a of the large rib 7, and thus the cage 10 is positioned in the radial direction by the outer peripheral face 7a of the large rib 7. In this way, the cage 10 is positioned in the radial direction by both the outer ring raceway surface 3a and the outer peripheral face 7a of the large rib 7. As a result, the cage 10 is positioned more stably.

Figure 10:
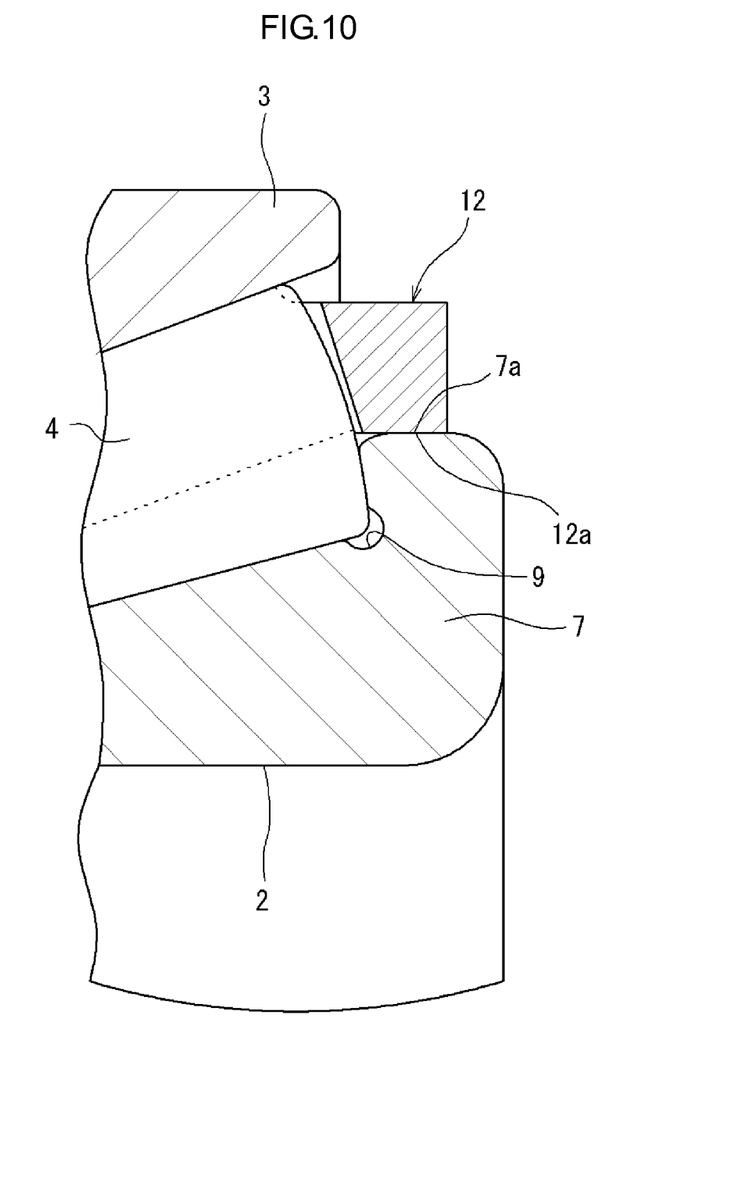
FIG. 10 is a main portion sectional view illustrating a modified example of a large-diameter annular portion of the cage.

In the case illustrated in FIG. 10, almost no clearance is formed between the inner peripheral face 12a of the larger-diameter annular portion 12 and the outer peripheral face 7a of the large rib 7. Thus, it is possible to further restrict discharge of the lubricant from the tapered roller bearing 1 through a clearance on the inner ring 2 side. As compared with the above-described embodiment, it is possible to hold a larger amount of lubricant in the vicinity of the position at which the large rib end face 7b of the inner ring 2 and the roller large end face 4b of each tapered roller 4 are brought into sliding contact with each other.

With the tapered roller bearing according to the invention, it is possible to effectively reduce the sliding friction between the roller large end faces of the tapered rollers and the large rib end face of the inner ring.

What is claimed is:

1. A tapered roller bearing comprising:
   an inner ring having an inner ring raceway surface and a large rib that is adjacent a first axial end of the inner ring raceway surface;
   an outer ring disposed radially outward of the inner ring so as to be concentric with the inner ring, and having an outer ring raceway surface that faces the inner ring raceway surface;
   a plurality of tapered rollers rollably disposed between the inner ring raceway surface and the outer ring raceway surface; and
   a cage that holds the tapered rollers at prescribed intervals in a circumferential direction of the tapered roller bearing, wherein
   each of the tapered roller has a roller large end face formed as a convex face, and a large rib end face of the large rib, which is in sliding contact with the roller large end face, is formed as a concave face;
   when a distance R is defined as a distance from a cone center of each of the tapered rollers to a prescribed reference point that is apart from the cone center along the inner ring raceway surface,
   the large rib end face is formed at such a position that the large rib end face passes through the reference point, and a curvature radius Ri of the large rib end face is set to a value within a range from 100% to 120% of the distance R, and
   the roller large end face is formed at such a position that the roller large end face passes through the reference point, and a curvature radius Rr of the roller large end face is set to a value within a range from 80% to 100% of the distance R.

2. The tapered roller bearing according to claim 1 wherein the curvature radius Ri of the large rib end face and the curvature radius Rr of the roller large end face satisfy a relationship $R=(Ri+Rr)/2$.

3. The tapered roller bearing according to claim 2, wherein a grinding undercut portion having a concave section is formed in a corner portion formed between the inner ring raceway surface and the large rib end face, the grinding undercut portion being located radially inward of the inner ring raceway surface.

4. The tapered roller bearing according to claim 3, wherein:
   the cage has a smaller-diameter annular portion, a larger-diameter annular portion that faces the smaller-diameter annular portion at a prescribed distance, and a plurality of cage bars extended between the small-diameter annular portion and the large-diameter annular portion to connect the small-diameter annular portion and the large-diameter annular portion to each other, the cage bars, the small-diameter annular portion and the large-diameter annular portion defining cage pockets in which the tapered rollers are held and accommodated;
   at least one of the small-diameter annular portion and the large-diameter annular portion has a first sliding-contact face that is in sliding contact with end faces of the tapered rollers so that the cage is positioned in an axial direction of the tapered roller bearing, using the end faces of the tapered rollers, and
   each of the cage bars has a second sliding-contact face that is in sliding contact with the outer ring raceway surface so that the cage is positioned in a radial direction of the tapered roller bearing, using the outer ring raceway surface.

5. A power transmission device comprising:
   a power transmission shaft disposed on a power transmission path; and
   the tapered roller bearing according to claim 4, by which the transmission shaft is rotatably supported.

6. A power transmission device comprising:
   a power transmission shaft disposed on a power transmission path; and
   the tapered roller bearing according to claim 3, by which the transmission shaft is rotatably supported.

7. The tapered roller bearing according to claim 2, wherein:
   the cage has a smaller-diameter annular portion, a larger-diameter annular portion that faces the smaller-diameter annular portion at a prescribed distance, and a plurality of cage bars extended between the small-diameter annular portion and the large-diameter annular portion to connect the small-diameter annular portion and the large-diameter annular portion to each other, the cage bars, the small-diameter annular portion and the large-diameter annular portion defining cage pockets in which the tapered rollers are held and accommodated;

at least one of the small-diameter annular portion and the large-diameter annular portion has a first sliding-contact face that is in sliding contact with end faces of the tapered rollers so that the cage is positioned in an axial direction of the tapered roller bearing, using the end faces of the tapered rollers, and each of the cage bars has a second sliding-contact face that is in sliding contact with the outer ring raceway surface so that the cage is positioned in a radial direction of the tapered roller bearing, using the outer ring raceway surface.

8. A power transmission device comprising:
a power transmission shaft disposed on a power transmission path; and
the tapered roller bearing according to claim 7, by which the transmission shaft is rotatably supported.

9. A power transmission device comprising:
a power transmission shaft disposed on a power transmission path; and
the tapered roller bearing according to claim 2, by which the transmission shaft is rotatably supported.

10. The tapered roller bearing according to claim 1, wherein a grinding undercut portion having a concave section is formed in a corner portion formed between the inner ring raceway surface and the large rib end face, the grinding undercut portion being located radially inward of the inner ring raceway surface.

11. The tapered roller bearing according to claim 10, wherein:
the cage has a smaller-diameter annular portion, a larger-diameter annular portion that faces the smaller-diameter annular portion at a prescribed distance, and a plurality of cage bars extended between the small-diameter annular portion and the large-diameter annular portion to connect the small-diameter annular portion and the large-diameter annular portion to each other, the cage bars, the small-diameter annular portion and the large-diameter annular portion defining cage pockets in which the tapered rollers are held and accommodated;

at least one of the small-diameter annular portion and the large-diameter annular portion has a first sliding-contact face that is in sliding contact with end faces of the tapered rollers so that the cage is positioned in an axial direction of the tapered roller bearing, using the end faces of the tapered rollers, and each of the cage bars has a second sliding-contact face that is in sliding contact with the outer ring raceway surface so that the cage is positioned in a radial direction of the tapered roller bearing, using the outer ring raceway surface.

12. A power transmission device comprising:
a power transmission shaft disposed on a power transmission path; and
the tapered roller bearing according to claim 11, by which the transmission shaft is rotatably supported.

13. A power transmission device comprising:
a power transmission shaft disposed on a power transmission path; and
the tapered roller bearing according to claim 10, by which the transmission shaft is rotatably supported.

14. The tapered roller bearing according to claim 1, wherein:
the cage has a smaller-diameter annular portion, a larger-diameter annular portion that faces the smaller-diameter annular portion at a prescribed distance, and a plurality of cage bars extended between the small-diameter annular portion and the large-diameter annular portion to connect the small-diameter annular portion and the large-diameter annular portion to each other, the cage bars, the small-diameter annular portion and the large-diameter annular portion defining cage pockets in which the tapered rollers are held and accommodated;

at least one of the small-diameter annular portion and the large-diameter annular portion has a first sliding-contact face that is in sliding contact with end faces of the tapered rollers so that the cage is positioned in an axial direction of the tapered roller bearing, using the end faces of the tapered rollers, and each of the cage bars has a second sliding-contact face that is in sliding contact with the outer ring raceway surface so that the cage is positioned in a radial direction of the tapered roller bearing, using the outer ring raceway surface.

15. A power transmission device comprising:
a power transmission shaft disposed on a power transmission path; and
the tapered roller bearing according to claim 14, by which the transmission shaft is rotatably supported.

16. A power transmission device comprising:
a power transmission shaft disposed on a power transmission path; and
the tapered roller bearing according to claim 1, by which the transmission shaft is rotatably supported.

* * * * *